• United States Patent • (10) Patent No.: US 8,013,481 B2
Sommerlatte et al. (45) Date of Patent: Sep. 6, 2011

(54) DETUNER FOR TUNING TORSIONAL MODE OF A ROTATING BODY

(75) Inventors: Klaus Werner Sommerlatte, Guilderland, NY (US); Siddharth Navinchandra Ashar, Guilderland, NY (US); Alexander Gabriel Beckford, Glenville, NY (US); Eric Steven Buskirk, Guilderland, NY (US); Benjamin Alber Mancuso, Schenectady, NY (US); Anthony Rigosu, Altamont, NY (US)

(73) Assignee: General Electric Company, Schenectady, NY (US)

( * ) Notice: Subject to any disclaimer, the term of this patent is extended or adjusted under 35 U.S.C. 154(b) by 253 days.

(21) Appl. No.: 12/412,619

(22) Filed: Mar. 27, 2009

(65) Prior Publication Data

US 2010/0242614 A1 Sep. 30, 2010

(51) Int. Cl.
*H02K 5/24* (2006.01)
*G01D 9/00* (2006.01)
*G01H 1/10* (2006.01)
*G01N 29/00* (2006.01)
*G01M 1/00* (2006.01)

(52) U.S. Cl. ............... 310/51; 73/471; 73/650
(58) Field of Classification Search ............ 310/51; 73/650, 471; 416/144, 145; 123/192.2
See application file for complete search history.

(56) References Cited

U.S. PATENT DOCUMENTS

| | | | | |
|---|---|---|---|---|
| 3,710,618 A | * | 1/1973 | Pagel | 73/862.323 |
| 4,211,105 A | * | 7/1980 | Szabo et al. | 73/11.05 |
| 5,625,511 A | * | 4/1997 | Brooks et al. | 360/99.08 |
| 5,700,116 A | * | 12/1997 | Cobb, Jr. | 409/141 |
| 6,976,503 B2 | | 12/2005 | Ens et al. | |
| 7,717,013 B2 | * | 5/2010 | Hildebrand et al. | 74/574.2 |
| 2002/0070622 A1 | * | 6/2002 | Rico et al. | 310/216 |
| 2006/0091741 A1 | * | 5/2006 | Safonov | 310/51 |

* cited by examiner

*Primary Examiner* — Quyen Leung
*Assistant Examiner* — Terrance Kenerly
(74) *Attorney, Agent, or Firm* — Hoffman Warnick LLC; Ernest G. Cusick

(57) ABSTRACT

A solution is provided for tuning the frequency of a torsional mode of interest of a rotating body (such as a generator rotor torsional mode) by adding a detuner to act as an undamped torsional vibration absorber. The detuner may be coupled to an overhung shaft extending from the rotating body. The detuner may be modular, therefore weight can be added or subtracted easily from the detuner in order to adjust the stiffness and/or inertia of the overhung shaft. This change in stiffness and/or inertia yields a torsional frequency of oscillation in the overhung shaft substantially similar to the natural frequency of the torsional mode of interest of the rotating body, therefore forcing the frequency of the torsional mode of interest of the rotating body above or below its torsional natural frequency.

17 Claims, 1 Drawing Sheet

DETUNER FOR TUNING TORSIONAL MODE OF A ROTATING BODY

FIELD OF THE INVENTION

The invention relates generally to rotating body technology. More particularly, the invention relates to a solution for tuning the frequency of a rotating body torsional mode by adding a detuner to act as an undamped torsional vibration absorber.

BACKGROUND OF THE INVENTION

Rotating bodies, such as rotors, are used in many different types of mechanical and electrical elements, including generators, motors and other similar devices. These rotating bodies have multiple torsional natural frequency modes and for a variety of reasons, including stress, fatigue, performance, etc., it is desirable to keep these frequency modes within certain ranges. For example, generators, or other mechanical elements including a rotating body, typically have at least one torsional natural frequency mode close to twice a line frequency. If this frequency mode becomes too close to twice a line frequency and becomes excited, it can cause failure of elements in a coupled body, such as the last stage buckets in a coupled turbine.

Currently, the frequency of a rotating body torsional mode can be shifted by changes in either inertia or torsional stiffness that directly impact the frequency of the rotating body mode of interest, i.e., by adding or removing large shrunk-on rings. Therefore, the current method for tuning the frequency of a rotating body torsional mode that is operating at or near a torsional natural frequency requires, minimally, decoupling the rotor from the prime mover and exposing the rotor to allow the installation/removal of enclosure rings over the coupling. These are large, high strength and expensive rings. If this method does not provide a significant enough shift in the torsional natural frequency mode then the rotating body, or components in the coupling, need to be machined to remove stiffness or inertia depending on the scenario. Machining is generally not easily reversible if the modifications do not work because it typically requires an on-site lathe or completely removing the generator from the field and sending it to a service shop for machining. Each of these steps would add significant expense to the solution and could cause an extension in the outage if extensive work was required.

These current methods for tuning the frequency of a rotor torsional mode are further undesirable because they do not target just the torsional frequency, or vibration, of the rotor modes. Instead, the current methods of adding mass, i.e., rings as discussed above, can affect the frequency of other objects connected to the rotating body which can result in unacceptable stress levels or unwanted lateral frequency changes.

BRIEF DESCRIPTION OF THE INVENTION

Embodiments of this invention provide a solution for tuning the frequency of a rotating body torsional mode by adding a detuner to act as an undamped torsional vibration absorber.

A first aspect of the disclosure provides a method for tuning a frequency of a torsional mode of a rotating body, the method comprising: providing an overhung shaft extending from the rotating body; coupling a detuner to the overhung shaft; and adjusting a physical characteristic of the detuner such that a frequency of a torsional mode of the overhung shaft is substantially the same as a natural frequency of the torsional mode of the rotating body.

A second aspect of the disclosure provides a system for tuning a frequency of a torsional mode of a rotating body, the system comprising: a rotating body, including an overhung shaft extending therefrom; a detuner, coupled to the overhung shaft; and means for adjusting a physical characteristic of the detuner such that a frequency of a torsional mode of the overhung shaft is substantially the same as a natural frequency of the torsional mode of the rotating body.

A third aspect of the disclosure provides a system for tuning a frequency of a torsional mode of a generator rotor, the system comprising: a generator rotor, including an overhung shaft extending therefrom; a detuner, coupled to the overhung shaft; and means for adjusting a physical characteristic of the detuner such that a frequency of a torsional mode of the overhung shaft is substantially the same as a natural frequency of the torsional mode of the generator rotor.

Figure 1:
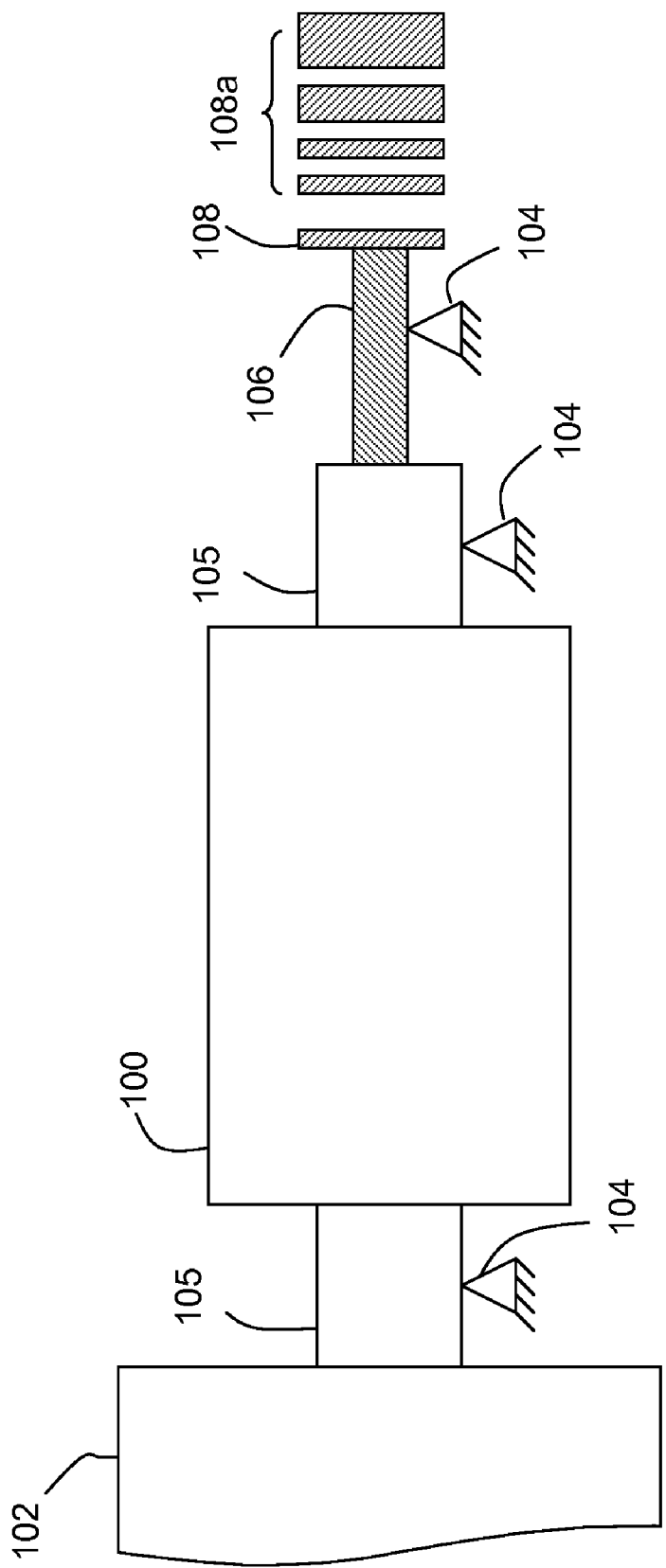
FIG. 1 shows a schematic block diagram illustrating embodiments of a detuner coupled to a rotating body according to embodiments of this invention.

It is noted that the drawings of the invention are not to scale. The drawings are intended to depict only typical aspects of the invention, and therefore should not be considered as limiting the scope of the invention.

DETAILED DESCRIPTION OF THE INVENTION

Referring to the drawing, FIG. 1 shows a schematic block diagram illustrating a rotating body 100 connected to a mechanical device 102 via an overhung shaft 105. Rotating body 100 may be referred to herein as a generator rotor, but it is understood that any mechanical element that includes a rotating body can be used in conjunction with embodiments of this invention. Mechanical device 102 can be any device that is coupled to rotating body 100 such as a steam turbine, gas turbine, combined gas and steam turbine, etc. As shown in FIG. 1, rotating body 100 can be supported by any known means, including bearings 104.

Embodiments of this invention can include either an added/subtracted component, or a machining process that will alter the stiffness and/or inertia of overhung shaft 105 connected to generator rotor 100. This change in stiffness and/or inertia will yield a torsional natural frequency of oscillation in overhung shaft 105 substantially similar to the torsional natural frequency of the mode of interest in rotating body 100. By adding a small amount of inertia via a detuner 106 (e.g., a connected shaft with or without a bolted on wheel) at the end of overhung shaft 105, the entire inertia of overhung shaft 105 is effectively utilized to alter the torsional natural frequency of the mode of interest in rotating body 100.

Accordingly, rather than using traditional means of adjusting a torsional natural frequency of a mode of rotating body 100 (i.e., adding rings to rotating body 100 to modify the stiffness or inertia of rotating body 100 itself), an embodiment of this invention uses detuner 106 to affect the torsional frequency of overhung shaft 105 which in turn forces the torsional natural frequency of the mode of interest of rotating body 100 above or below its current torsional natural frequency. For example, as shown in FIG. 1, detuner 106 is coupled to overhung shaft 105 at an open end of rotating body 100 to act as an undamped torsional vibration absorber. Detuner 106 is shown in FIG. 1 as a connected shaft, although other shapes or configurations are possible. Detuner 106 can be optionally supported by a support, such as bearing 104, if desired.

Once the torsional natural frequency of the mode of interest of rotating body 100 is calculated, detuner 106 is adjusted such that the torsional frequency of overhung shaft 105 is substantially the same as the torsional natural frequency of the mode of interest of rotating body 100. Since two coupled objects cannot operate at identical frequencies, one of the objects' frequencies will increase and one will decrease. Therefore, once the torsional frequency of overhung shaft 105 is at substantially the same torsional frequency as the mode of interest in rotating body 100, the frequency of the torsional mode of interest in rotating body 100 will be forced above or below its current torsional natural frequency.

Means for adjusting detuner 106 can include any known now or later developed means for adjusting the weight, size, stiffness and/or inertia of detuner 106. In one embodiment, detuner 106 can be easily adjusted because it is modular, i.e., weight can be easily added or subtracted. FIG. 1 shows one embodiment where the means for adjusting includes adding weight to detuner 106, e.g., added mass 108 (for example, in the form of a bolted on wheel) has been added to detuner 106. As also shown in FIG. 1, additional removable masses 108*a* (e.g., in the form of additional wheels of various size and shapes) can also be added or subtracted to detuner 106 to achieve the desired torsional frequency. Other means for adjusting detuner 106 could include altering or machining the size and shape of detuner 106 itself to adjust the inertia or stiffness of detuner 106, e.g., detuner 106 may be a larger or smaller connected shaft.

This change in weight, stiffness and/or inertia of detuner 106 will affect the torsional frequency of oscillation in overhung shaft 105, so that an operator is able to adjust detuner 106 such that the torsional frequency of overhung shaft 105 is substantially the same as the natural frequency of the rotating body torsional mode of interest. Therefore, the natural frequency of each section of overhung shaft 105 will split away from this point. The magnitude of this split will depend on the mass ratio between the sections. The goal is to avoid torsional resonant response of rotating body 100 by moving resonances away from first and second harmonics of the electrical frequency of the power grid. This is because key torsional excitation events are driven through rotating body 100, which is in series with the grid. Exclusion zones around 1× and 2× line frequency are defined based on summation of the power grid variation in frequency and the calculation error margin.

Typically, detuner 106 is significantly smaller in size than rotating body 100. For example, the ratio between the size of detuner 106 and rotating body 100 may be approximately 1 to 1000. Detuner 106 can be made of any known material capable of being coupled to overhung shaft 105 or rotating body 100. Detuner 106 need not be of a certain material, shape and/or density. Whatever the size and shape of detuner 106, it can be adjusted accordingly to achieve the desired torsional frequency. For example, if overhung shaft 105 is at a higher torsional frequency than rotating body 100, more mass can be added to detuner 106 to lower the torsional frequency of overhung shaft 105.

As known in the art, other mechanical elements, such as additional rotating bodies or additional engines can be coupled together in line with rotating body 100 and mechanical element 102. Regardless of the configuration of mechanical elements, detuner 106 can be connected at an open end of the line. For example, as FIG. 1 shows, detuner 106 is coupled to an open end of rotating body 100 via overhung shaft 105.

In contrast to prior art methods, effects, aside from the desired dynamic vibration absorption, from the addition of detuner 106 to overhung shaft 105 are negligible to main rotating body 100 and the rest of the system. This is beneficial because large changes in stiffness or inertia of the system could lead to other design issues, such as unacceptable stress levels or unwanted lateral frequency changes.

Furthermore, since the alteration of the stiffness and/or inertia of overhung shaft 105 is a low impact change and the work can be done while the unit is still fully assembled, there is an opportunity to verify that results are acceptable and make further adjustments as needed. Torsional testing, using torque rings (not shown), can also be used as a means to both: identify problematic rotor frequencies and to validate the effectiveness of detuner 106.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for tuning a frequency of a torsional mode of a rotating body coupled to a turbomachine, the method comprising:
   providing an overhung shaft extending from the rotating body;
   coupling a detuner to the overhung shaft; and
   adjusting at least one of: a torsional stiffness and a rotational inertia of the detuner such that a frequency of a torsional mode of the overhung shaft is substantially identical to a natural frequency of the torsional mode of the rotating body.

2. The method of claim 1, wherein the adjusting includes adding or subtracting weight from the detuner.

3. The method of claim 1, wherein a frequency of the torsional mode of the rotating body after the adjusting is above or below the natural frequency of the torsional mode of the rotating body.

4. The method of claim 1, wherein the rotating body is coupled to one of the following: a gas turbine, a steam turbine, and a combined gas and steam turbine.

5. The method of claim 1, wherein a ratio between a size of the detuner and the rotating body is approximately 1 to 1000.

6. The method of claim 1, wherein the coupling further includes coupling the detuner to the overhung shaft at an open end of the rotating body.

7. A system for tuning a frequency of a torsional mode of a rotating body, the system comprising:
   a rotating body coupled to a turbomachine, including an overhung shaft extending therefrom;
   a detuner, coupled to the overhung shaft; and means for adjusting at least one of: a torsional stiffness and a rotational inertia of the detuner such that a frequency of a torsional mode of the overhung shaft is substantially identical to a natural frequency of the torsional mode of the rotating body.

8. The system of claim 7, wherein the means for adjusting includes adding or subtracting weight from the detuner.

9. The system of claim 7, wherein a frequency of the torsional mode of the rotating body is above or below the natural frequency of the torsional mode of the rotating body.

10. The system of claim 7, wherein the rotating body is coupled to one of the following: a gas turbine, a steam turbine, and a combined gas and steam turbine.

11. The system of claim 7, wherein a ratio between a size of the detuner and the rotating body is approximately 1 to 1000.

12. The system of claim 7, wherein the detuner is coupled to the overhung shaft at an open end of the rotating body.

13. A system for tuning a frequency of a torsional mode of a generator rotor, the system comprising:
    a generator rotor, including an overhung shaft extending therefrom;
    a detuner, coupled to the overhung shaft; and
    means for adjusting at least one of: a torsional stiffness and a rotational inertia of the detuner such that a frequency of a torsional mode of the overhung shaft is substantially identical to a natural frequency of the torsional mode of the generator rotor.

14. The system of claim 13, wherein the means for adjusting includes adding or subtracting weight from the detuner.

15. The system of claim 13, wherein a frequency of the torsional mode of the generator rotor is above or below the natural frequency of the torsional mode of the generator rotor.

16. The system of claim 13, wherein a ratio between a size of the detuner and the generator rotor is approximately 1 to 1000.

17. The system of claim 13, wherein the detuner is coupled to the overhung shaft at an open end of the generator rotor.

* * * * *